United States Patent [19]

Suzuki et al.

[11] 4,014,770
[45] Mar. 29, 1977

[54] FOAM AND FLAME-BREAKABLE RESIN COMPOSITION

[75] Inventors: Kazuo Suzuki; Tsutomu Nanao; Hiroshi Miyazaki, all of Otsu, Japan

[73] Assignee: Kanegafuchi Kagaku Kogyo Kabushiki Kaisha, Osaka, Japan

[22] Filed: June 9, 1975

[21] Appl. No.: 584,826

[30] Foreign Application Priority Data

June 8, 1974 Japan ............................ 49-65247

[52] U.S. Cl. ......................... 204/159.14; 138/177; 204/159.18; 204/159.20; 252/378 R; 260/2.5 E; 260/2.5 B; 260/2.5 FP; 260/2.5 P; 260/897 C; 260/DIG. 24; 427/36; 427/44; 427/373; 427/385 R; 428/921

[51] Int. Cl.² ...................... C08F 8/00; C08F 2/54; C08L 23/08

[58] Field of Search ................. 204/159.20, 159.14; 260/897 C, 2.5 FP, 2.5 E, 2.5 B, 2.5 P, DIG. 24; 252/378 R; 427/36

[56] References Cited

UNITED STATES PATENTS

| 3,455,850 | 7/1969 | Saunders | 252/378 R X |
| 3,517,083 | 6/1970 | Salyer | 260/878 |
| 3,582,518 | 6/1971 | Lyons | 260/897 C |
| 3,600,335 | 8/1971 | Fukushima et al. | 260/2.5 P |
| 3,849,368 | 11/1974 | Anderson et al. | 204/159.14 |
| 3,864,432 | 2/1975 | Adler et al. | 260/897 C |
| 3,908,068 | 9/1975 | MacKenzie, Jr. et al. | 260/897 C X |
| 3,933,731 | 1/1976 | Machi et al. | 204/159.2 X |
| 3,953,650 | 4/1976 | Sauer et al. | 428/389 |

Primary Examiner—Murray Tillman
Assistant Examiner—Thurman K. Page
Attorney, Agent, or Firm—Moonray Kojima

[57] ABSTRACT

A foam and flame-breakable resin composition comprising a non-inflammable agent, an auxiliary non-inflammable agent, a foaming agent, an ash coagulating agent and a resin system consisting essentially of a blend of a copolymer of ethylene and vinyl acetate having a high melt viscosity with the vinyl acetate content being between 40 to 80 weight percent and the molecular weight being more than 200,000, and polyvinyl chloride in a ratio of copolymer to polyvinyl chloride of 2:8 to 7:3. The composition may be further subjected to vulcanization treatment.

3 Claims, 1 Drawing Figure

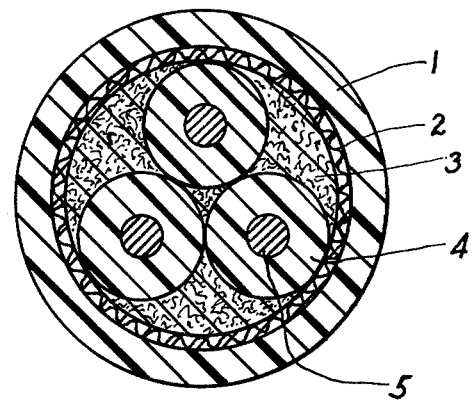

FOAM AND FLAME-BREAKABLE RESIN COMPOSITION

BACKGROUND OF THE INVENTION

This invention relates to foam and flame-breakable resin compositions.

In recent years, there has been increasing demand for materials having superior non-inflammability, usable for example, in insulated wire and cable, buildings and structures, machines, tools, etc. Plastic materials having such properties have been increasingly used for insulated wire and cable. More stringent requirements have been established for those plastic materials, for example as set forth in UL (Underwriter's Laboratories, Inc) Standards, especially for consumer items.

However, for insulation for high voltage circuits and high frequency circuits, etc, inevitably, a polyethylene which is a very inflammable polymer has been used to insulate wire and cable. Disadvantageously, such polyethylene tends to burn easily in a fire emergency.

In order to decrease inflammability of polyethylene, attempts have been made to make the polyethylene insulator itself noninflammable. Also, a sheathing layer (used about the polyethylene layer) having an ability to prevent flames from touching the polyethylene, has been used.

A superior non-inflammable sheathing material for wire and cable is needed. As a flame test method to examine the non-inflammability of such wire and cable, IEEE Std. 382–1974 is the standardixed test usually used. Since the sheating material of wire and cable should have a superior non-inflammability of high degree in order to pass such stringent tests, a material which has both properties as a material for cable sheating and superior non-inflammability of high degree meeting the flame test standard, has not yet been realized. In order to make a cable having a desired foam and flame breakable property, previously, the cable was coated with a special material having superior flame proof property after installation of the cable. The sheathing layer covers the inner insulating layer of polyethylene. The sheathing material protects the inner polyethylene layer from flames by retaining its state as a sheathing layer when subjected to flames and gradually foaming but not dropping off by fusion. In this manner the inner easily inflammable layer of polyethylene is not exposed to flames. Moreover, even if the sheathing layer is carbonized or burnt to ash, it should retain a protective layer to prevent the inner, easily inflammable insulating layer from directly contacting the flame.

Previously, as a non-inflammable sheathing material for insulated wire and cable, polyvinyl chloride (hereinafter called "PVC") has been mainly used and on other occasions, various copolymers containing ethylene, vinyl acetate, and vinyl chloride have been used.

As is well known, and although PVC itself has good non-inflammability property, the flame breakable ability of PVC is substantially decreased by the presence of plasticizers. For this reason, PVC compounds cannot be a superior flame breakable material. It is often necessary to add a large amount of plasticizer, such as more than 40 parts per 100 parts of PVC (in terms of weight), in order to impart necessary degree of workability, flexibility and softness at a low temperature. This type of soft PVC is used in the sheathing.

Even though PVC is a material having high oxygen index and has good non-inflammability, since soft PVC composition contains a large amount of plasticizer, its melt viscosity decreases considerably when it is exposed to a flame and accordingly decreases its ability to foam even if a sufficient amount of foaming agent is contained, and then drops off, thus exposing the inner easily inflammable insulating layer to the flame.

Since graft copolymer of ethylene-vinyl acetate-vinyl chloride can be prepared to be soft plastic material without mixing in any plasticizer, the graft copolymer does not drop off by fusion when contacted with a flame, and shows good foamability. However, this material is inferior to PVC resin composition as a sheathing material from the standpoint of oil resistance and heat deformation.

SUMMARY OF THE INVENTION

Accordingly, an object of the invention is to solve the aforementioned and other problems and disadvantages of the prior art.

The present inventors have discovered that it is possible to increase the flame breakable properties considerably by the use of a resin system which is prepared by blending PVC with a special copolymer of ethylene-vinyl acetate (hereinafter called "EVA") to produce a flame breakable sheathing material, since the amount of platicizer to be used for this system can be reduced considerably.

The present invention encompasses a flame breakable resin compound which is prepared by mixing a non-inflammable agent, an auxiliary non-inflammable agent, a foaming agent, and an ash coagulating agent into a resin blend consisting essentially of EVA of high melt viscosity, molecular weight of more than 200,000 and having vinyl acetate content of between 40 to 80 weight percent of the copolymer, and PVC blended therewith in the ratio of EVA:PVC of 2:8 to 7:3. Moreover, the composition may be further treated for vulcanization.

BRIEF DESCRIPTION OF DRAWING

The single FIGURE depicts in cross section a cable structure used in the flame test.

DETAILED DESCRIPTION OF PREFERRED EMBODIMENTS

The property of EVA is very much different depending on the ratio of ethylene to vinyl acetate and its molecular weight. A copolymer having less than 40 weight percent vinyl acetate has high rigidity, first order transition point, large degree of crystallization and low breaking elongation. Where the vinyl acetate content of the copolymer is more than 80 weight percent, the copolymer has low breaking elongation, high rigidity and second order transition.

A copolymer having vinyl acetate of between 40 to 80 weight percent has good compatibility with PVC, better than a copolymer whose vinyl acetate content is outside of that range, and has considerable plasticizing effect on the PVC.

Furthermore, concerning the molecular weight of the copolymer, a copolymer having a molecular weight of less than 200,000 has low softening point, low melt viscosity, inferior mechanical strength, and inferior heat stability. On the other hand, a copolymer whose molecular weight is higher than 200,000 has high softening point and accordingly its mechanical strength and heat stability are improved.

Although EVA whose content of vinyl acetate is between 40 to 80 weight percent and whose molecular weight is lower than 200,000 is known for blending with PVC, such known blends have decreased softening point and is sticky and has inferior oil resistance. Thus, such EVA having molecular weight lower than 200,000 cannot be used for the purpose of this invention.

By the blending of EVA, whose content of vinyl acetate is within the range of 40 to 80 weight percent and whose molecular weight is higher than 200,000, with PVC it is possible to obtain a blend which has superior general properties and superior flame breakable properties without the occurence of dropping off of the blend by fusion when contacted with a flame. The ratio of PVC:EVA must be within the range of 8:2 to 3:7 for optimum results. The blend can be mixed with other agents and then used as a sheathing material.

If the content of PVC in the blend is larger than 8:2 (PVC:EVA), its flame breakable ability as a soft compound having added thereto a plasticizer, decreases. It is necessary then to use a larger amount of plasticizer to obtain a soft PVC composition. On the other hand, if the amount of PVC is smaller than 3:7 (PVC:EVA), its flame breakable property as a soft compound also decreases due to inferior non-inflammability of EVA contained in the blend in a larger amount. In this case, a smaller amount of plasticizer will be sufficient to prepare a soft compound. By suitable balance of the above factors, the inventors have discovered that the optimum range of ratio of PVC to EVA was as above stated.

As the non-inflammable agent used in the present invention, halogen compounds such as chlorinated paraffin, and phosphorus compounds, such as ammonium salt of polyphosphoric acid are preferred.

As the auxiliary non-inflammable agent, those compounds which react with halogen and enhance the non-inflammability can be used. Among them, diantimony trioxide and metal borate are preferred.

As the ash coagulating agent, there may be used to catch carbonized matter burned by a flame or ash and prevent its falling down from the surface of the easily inflammable inner insulating layer, and thus protect the inner layer from flames, such compounds as boron compounds, lead compounds, etc, which compounds can be a component for forming a glass of low melting point.

As the foaming agent in the present invention, although it is possible to use organic or inorganic foaming agent, a necessary condition is to use a foaming agent which decomposes only at high temperature in order that no foaming of the resin compound takes place during manufacture of the insulated wire and cable by such process as extrusion. Examples of such foaming agent are those belonging to hydrazine sulphate, inorganic foaming agent such as aluminum hydroxide, magnesium carbonate, calcium carbonate, and other inorganic compounds which have a water of crystallization which is liberated at temperatures higher than 200° C.

Furthermore, in order to increase the flame breakability of the obtained resin composition, it is effective to add a peroxide to the compound or to irradiate the compound with an electron beam to derive the polymer contained in the resin compound into a three dimensional structure to a certain degree. By this treatment for vulcanization, the dropping off of the sheathing layer of the flame breakable resin compound of the present invention by contact with a flame in an emergency is remarkably prevented. Moreover, the foaming effect is also considerably increased. Examples of peroxide usable in the invention are dicumyl peroxide, 2,5-dimethyl-2.5-(t-butyl peroxy)-hexyne, etc, which can be activated only at a higher temperature. The peroxide may be used in an amount of from 0.2 to 5 parts per 100 parts of the resin system, in terms of weight.

For the vulcanization of the resin compound by irradiation, the irradiation may be done by an electron beam of 2 to 10 Mrad.

The resin composition thus obtained in the present invention may be used for various purposes, such as a flame breakable resin composition. Especially, it is superior as a sheathing material for insulated wires and cables.

The invention will now be further illustrated with actual examples, which are not be be considered to be limiting in any manner.

EXAMPLES 1–7

After preparing 7 different compositions in different proportions, as listed in Table 1, by mixing at 160° C for 10 minutes and using mixing roll, test pieces having dimensions of 10 mm width, 3 mm thickness and 150 mm length, were prepared by pressing at 155° C for 7 minutes. The tendency to drop by fusion and the foaming property were tested in the following manner. Each test piece was contacted with a flame of about 12 cmlength at an angle of 20° C for 15 sec. After contact for 15 sec., the flame was kept away for 15 sec and again was contacted for 15 sec. This procedure was repeated until the test piece dropped by fusion or was cut off by burning and the number of times the contact was repeated was recorded. At the same time, the foaming tendency and the residual flame on the test piece were observed. The results are also shown in Table 1.

TABLE 1

| Composition | 1 | 2 | 3 | 4 | 5 | 6 | 7* |
|---|---|---|---|---|---|---|---|
| PVC (P=1300) Kanevinyl S1003 | 100 | 80 | 60 | 40 | 20 | 60 | 60 |
| EVA(VA=60wt %) MW;ca. 1,000,000 | — | 20 | 40 | 60 | 80 | 40 | 40 |
| dioctyl phthalate | 60 | 40 | 20 | — | — | 20 | 20 |
| Tribasic lead sulphate | 5 | 5 | 5 | 5 | 5 | 5 | 5 |
| Stearic acid | 0.5 | 0.5 | 0.5 | 0.5 | 0.5 | 0.5 | 0.5 |
| Clay 33 | 30 | 30 | 30 | 30 | 30 | 30 | 30 |
| Diantimony trioxide | 5 | 5 | 5 | 5 | 5 | 5 | 5 |
| Foaming agent (hydrozine sulphate) | 5 | 5 | 5 | 5 | 5 | 5 | 5 |
| Dicumyl peroxide | | | | | | | 1 |

TABLE 1-continued

| Composition | Example 1 | 2 | 3 | 4 | 5 | 6 | 7* |
|---|---|---|---|---|---|---|---|
| Total | 205.5 | 185.5 | 165.5 | 145.5 | 145.5 | 166.5 | 165.5 |
| Flame Resistance (number of repeated contact with flame) | 1.0 | 2.0 | 3.0 | 3.5 | 3.0 | 5≦ | 5≦ |
| Foaming tendency | none | poor | gentle | good | good | very good | very good |
| Residual flame on test piece | none | none | none | none | exist | none | none |

*= irradiated by electron beam of 5 Mrad. (all parts and percentables are in terms of weight)

EXAMPLE 8.

After mixing 60 parts of PVC ($\bar{P} = 1300$), 40 parts of EVA (commercial name EVATHLENE containing 65 weight percent vinyl acetate and having ca. 500,000 molecular weight); 25 parts of plasticizer of polyester type made by Dainippon Ink & Chemicals Co, Ltd; 5 parts of stabilizer of tribasic lead sulphate; 0.5 parts of lubricant stearic acid; 10 parts of non-inflammable agent chlorinated paraffin; 5 parts of auxiliary non-inflammable agent diantimony trioxide; 20 parts ash coagulating agent zinc borate and 5 parts of foaming agent magnesium carbonate, by mixing roll for 15 minutes at 150° C; 2 parts of vulcanizing agent 2.5-dimethyl-2.5-(t-butyl peroxy)-hexyne was added to the compound and the compound was again mixed for 8 minutes by mixing roll and then prepared into a pellet. All parts and percentages recited in this and other examples are by weight.

Using this pellet, a coaxial cable with copper out bra such as shown in FIG. 1 was made. The thickness of the insulating layer of polyethylene 4 was 1.3 mm; and the sheathing layer made of the inventive composition 1, was 0.9 mm. The cable was made by an extrusion process in the manner known in the art. Turning to FIG. 1, there is depicted in cross section, three conductors, such as of 1 mm × 7, twisted wires, in each conductor, arranged parallel to each other and to the axis, and covered each by polyethylene insulators 4. The conductors are numbered 5. Filled between the insulator and the outer sheath 1, are jute intermediate covering 3 and cloth layer 2 in the manner depicted.

Each test piece of the cable of about 50 cm of length was fixed perpendicularly and contacted with a flame of a bunsen burner wherein the flame was adjusted so as to have a reducing flame of about 4 cm and an oxidizing flame of about 7 cm. Upon contact, the top of the reducing flame was held just touching the cable with an inclination of 20° C for 15 seconds. After contact for 15 seconds, the flame was held away from the sample for 15 seconds and again contacted for 15 seconds. After repeating the flame contacting procedure 5 times, the duration of contact of a residual flame on the cable was observed. In this test, when the duration of contact of a residual flame on the cable was longer than 15 seconds, the flame of the Bunsen burner was brought to the cable to contact with it just after the disappearance of the flame on the cable.

The observed results showed that the duration of a residual flame on the cable was zero.

EXAMPLE 9

A resin composition comprising 60 weight parts of PVC whose mean degree of polymerization ($\bar{P}$) was 1,300, 20 parts of an EVA whose melt viscosity was $4.7 \times 10^5$ poise and molecular weight was about 1,000,000 and containing 60 weight percent vinyl acetate (commercial name= EVATHLENE 410, produced by Dai-Nippon Ink & Chemical Co, Ltd); 20 parts of EVA whose melt index was $2.3 \times 10^4$ poise and molecular weight was about 500,000 and containing 65 weight percent vinyl acetate (commercial name = EVATHLENE 450, produced by Dai-nippon Ink & Chemical Co. Ltd); 25 parts of a plasticizer of the polyester type (commercial name = W-1200 produced by Dai-nippon Ink & Chemical Co, Ltd); 5 parts of tribasic lead sulphate, 1 part of lead stearate, 5 parts of diantimony trioxide; 25 parts of zinc borate; 15 parts of aluminum hydroxide and 10 parts chlorinated paraffin (commercial name = ENPARA 70, produced by Ajinomoto Corp.), was prepared into a pellet and then a sheet was cut after the foregoing components were intimately mixed by a mixing roll. The resin composition of the resin type was extruded on a cable core using a convention extruder ordinarily used for sheathing of insulated cables and the cable structure of FIG. 1 was manufactured. A vertical tray flame test of the cable in accordance with the method of IEEE Std 383–1974 was carried out.

The general properties and results of the flame test on the cable manufactured using the inventive composition are shown in Tables 2 and 3. The oxygen index fo the PVC insulator used in this cable was 24. It should be noted that insulator 4, in this test was made of PVC. Normally cables would have polyethylene insulators. In fact, the different layers can be made of any suitable material. The invention is directed in application to use, for example, as a sheath.

From Tables 2 and 3, it si apparent that the resin flame breakable composition of the invention has general properties comparable to and not in any way inferior to conventional PVC sheaths, and in addition, has a very superior foam and flame breakable property much better than that of the PVC sheath.

TABLE 2

| | | (General Properties of the Sheath Material) | Standard of present invention | Example 9 | Comparable Example 2. |
|---|---|---|---|---|---|
| Result of Tension Test at 25° C | Fresh sample After age-ing at | Tensile Strength (kg/mm$^2$) Elongation (%) Residual Tens. Str (%) | 1.2 150 90 | 1.60 390 106 | 2.0 370 99 |

TABLE 2-continued (General Properties of the Sheath Material)

| | | Standard of present invention | Example 9 | Comparable Example 2. |
|---|---|---|---|---|
| 120° C for 120 hrs. | Residual Elong (%) | 85 | 107 | 98 |
| After immersion in oil at 85° C for 4 hours. | Residual Ten. Str. (%) | 90 | 99 | 95 |
| | Residual Elong. (%) | 70 | 102 | 90 |
| | Distortion under heat 120° C for 1 hour under 1 kg load (%) | 50 | 12 | 9 |
| | Cold resistance (° C) | −15 | −24 | −26 |
| | Oxygen index | — | 41 | 23 |

Remarks: Observations were carried in accordance with JIS (Japanese INdustrial Standard) 6723 and JIS K-7201

TABLE 3

| Flame Test Combustion time after firing on burner (min) | Ex. 9 | Comp. Ex. 2 |
|---|---|---|
| *Insulation Resistance (MΩ) | | |
| 0 | ∞ | ∞ |
| 3 | 40 | 1 |
| 5 | 3 | 0(3.5 min) |
| 7 | 0.2 | |
| 10 | 0 | 0 |
| Dialectric breakdown (AC, 220 v, 3 phase,)(min) | 9 | 3.75 |
| Length of insulator burned (cm) | 35 | 190 |
| Length of sheath damaged (cm) | 70 | 210 |
| Max. temperature of conductor (° C) | 159 | 409 |

*= Meggar, 250V

COMPARATIVE EXAMPLE 1

After mixing 100 parts of PVC ($\bar{P}$ = 1300), 60 parts of plasticizer DOP (dioctyl phthalate); 5 parts stabilizer tribasic lead sulphate; 0.2 parts of lubricator stearic acid and 40 parts of filler calcium carbonate, by a mixing roll for 10 minutes at 150° C, a pellet was prepared. Using the pellet, an insulated cable was prepared as in Example 8 and the duration of residual flame on the cable was observed. As a result of this test, it was proven that the duration of residual flame on the cable in this example was as long as 150 seconds.

COMPARATIVE EXAMPLE 2

A PVC compound, consisting of 100 parts of PVC, having mean degree of polymerization of 1,300; 35 parts of di-iso-decyl phthalate (DIPP); 25 parts of tri-octyl trimellitate (TOTM); 5 parts of tribasic lead sulphate; 1 part lead stearate and 20 parts of calcium carbonate, was extruded on a cable core to sheath same in the same manner as in Example 9, and the combustion test was carried out on the cable in the same manner as in Example 9. The general properties of this sheath and the results of the flame test performed on the cable are shown in Tables 2 and 3.

The foregoing description illustrates the principles of this invention. Numerous other variations and modifications thereof would be apparent to the worker skilled in the art. All such variations and modifications are to be considered to be with the spirit and scope of the invention.

What is claim is:

1. A foam and flame-breakable resin composition employed in an ordinarily unfoamed state, comprising a blend of polyvinyl chloride and a copolymer of ethylene and vinyl acetate, said copolymer having a high melt viscosity, a molecular weight of more than 200,000 and having a vinyl acetate component of from 40 to 80 weight percent of said copolymer, and said blend having a polyvinyl chloride to copolymer ratio of from 8:2 to 3:7;

a non-inflammable agent selected from the group consisting of diantimony trioxide and metal borate;

an auxiliary non-inflammable agent selected from the group consisting of chlorinated paraffin and ammonium salt of polyphosphoric acid;

an ash coagulating agent selected from the group consisting of boron compounds and lead compounds; and a foaming agent selected from the group consisting of hydrazine suphate, aluminum hydroxide, magnesium carbonate, calcium carbonate, and other inorganic compounds having water of crystallization which is released at temperatures higher than 200° C, whereby contact of the normally unfoamed composition with fire causes said foaming agent to react and to expand and said composition to become foamed.

2. The composition of claim 1, wherein said composition is subjected to vulcanizing by electron beam at 2 to 10 Mrad.

3. The composition of claim 1, wherein comprising a peroxide selected from the group consisting of dicumyl peroxide, 2.5-dimethyl-2.5-(t-butyl peroxy)-hexyne, said peroxide being in an amount of from 0.2 to 5 weight parts per 100 parts by weight of said blend.

* * * * *